(12) United States Patent
Lehoux

(10) Patent No.: US 9,910,566 B2
(45) Date of Patent: Mar. 6, 2018

(54) COPY AND PASTE OPERATION USING OCR WITH INTEGRATED CORRECTION APPLICATION

(71) Applicant: Xerox Corporation, Norwalk, CT (US)

(72) Inventor: Thierry Armand Lehoux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 313 days.

(21) Appl. No.: 14/692,795

(22) Filed: Apr. 22, 2015

(65) Prior Publication Data

US 2016/0313881 A1    Oct. 27, 2016

(51) Int. Cl.
*G06F 3/0484* (2013.01)
*G06F 17/24* (2006.01)
*G06F 17/30* (2006.01)

(52) U.S. Cl.
CPC .......... *G06F 3/0484* (2013.01); *G06F 17/243* (2013.01); *G06F 17/30253* (2013.01); *G06K 2209/01* (2013.01)

(58) Field of Classification Search
CPC .. G06K 2209/01; G06F 17/243; G06F 3/0484
See application file for complete search history.

(56) References Cited

U.S. PATENT DOCUMENTS 5,530,907 A * 6/1996 Pavey ................ G06K 9/033
                                                                 358/400
5,889,897 A * 3/1999 Medina .............. G06K 9/03
                                                                 382/182
7,139,842 B2   11/2006 Goldstein
7,171,061 B2 * 1/2007 Sarkar ................ G06K 9/03
                                                                 382/309

(Continued)

OTHER PUBLICATIONS

A Voting System for Automatic OCR Correction: http://citeseerx.ist.psu.edu/viewdoc/summary?doi=10.1.1.20.1666) Implementation on ABBYY Ocr: http://www.abbyy-developers.eu/en:tech:features:voting-api, Apr. 21, 2015, p. 1.

*Primary Examiner* — William Bashore
*Assistant Examiner* — Nathan Shrewsbury
(74) *Attorney, Agent, or Firm* — Gibb & Riley, LLC

(57) ABSTRACT

Methods and systems execute different optical character recognition processes on an image using a network-based server to automatically recognize characters in the image, and aggregate the recognition results from the different optical character recognition processes to produce a final character recognition result that includes relatively higher confidence recognized characters and relatively lower confidence recognized characters. These methods and systems then output the final character recognition result from the network-based server to a remote computerized device over a computerized network. The output provides the relatively higher confidence recognized characters as default characters for pasting, and also provides the relatively lower confidence recognized characters as alternate characters for pasting. Additionally, this output provides a default pointer movement operation that automatically pastes the default characters into another input field, and a secondary pointer movement operation that automatically pastes one or more of the alternate characters for pasting into the input field.

20 Claims, 9 Drawing Sheets

(56) References Cited

U.S. PATENT DOCUMENTS

| | | | | |
|---|---|---|---|---|
| 8,619,147 B2* | 12/2013 | King | | G06F 17/30011 |
| | | | | 348/210.99 |
| 2004/0010758 A1* | 1/2004 | Sarkar | | G06K 9/03 |
| | | | | 715/256 |
| 2006/0071950 A1* | 4/2006 | Kurzweil | | G06T 5/006 |
| | | | | 345/698 |
| 2008/0212901 A1* | 9/2008 | Castiglia | | G06K 9/033 |
| | | | | 382/311 |
| 2008/0247674 A1* | 10/2008 | Walch | | G06K 9/344 |
| | | | | 382/305 |
| 2008/0267505 A1* | 10/2008 | Dabet | | G06F 17/243 |
| | | | | 382/181 |
| 2009/0159509 A1* | 6/2009 | Wojdyla | | B07C 3/18 |
| | | | | 209/584 |
| 2010/0215277 A1* | 8/2010 | Huntington | | G06K 9/00865 |
| | | | | 382/218 |
| 2011/0022940 A1* | 1/2011 | King | | G06F 17/30011 |
| | | | | 715/229 |
| 2011/0229036 A1* | 9/2011 | Reffle | | G06K 9/03 |
| | | | | 382/182 |
| 2011/0280481 A1* | 11/2011 | Radakovic | | G06K 9/033 |
| | | | | 382/177 |
| 2013/0287284 A1* | 10/2013 | Nepomniachtchi | | |
| | | | | G06K 9/00442 |
| | | | | 382/139 |
| 2013/0343652 A1* | 12/2013 | Goto | | G06K 9/342 |
| | | | | 382/182 |
| 2014/0304280 A1* | 10/2014 | Oursbourn | | G06F 17/30867 |
| | | | | 707/754 |
| 2014/0304628 A1 | 10/2014 | Soni et al. | | |
| 2015/0026549 A1 | 1/2015 | Shao | | |
| 2015/0169971 A1* | 6/2015 | Cummins | | G06F 17/20 |
| | | | | 382/182 |
| 2015/0254507 A1* | 9/2015 | Lin | | G06K 9/18 |
| | | | | 382/176 |
| 2016/0307034 A1* | 10/2016 | Goyal | | G06F 3/0484 |
| 2016/0342852 A1* | 11/2016 | Blanchflower | | G06K 9/6292 |

\* cited by examiner

COPY AND PASTE OPERATION USING OCR WITH INTEGRATED CORRECTION APPLICATION

BACKGROUND

Systems and methods herein generally relate to copy and paste operations using an OCR-based client server with automated correction abilities.

Agents in call centers, scanning rooms and service centers work with many different systems in parallel. Such systems might include a customer relationship management (CRM) system, a ticketing system, internal tracking systems, other databases or account information, as well as online resources. In these applications, part of the information is present in images or in fields that cannot be easily copied. During a normal "activity"/case resolution, the call center agent jumps back and forth between multiple systems and copies large amounts of information. At every switch, the call center agent might attempt to copy information from a field or document to another applications without success because the field may not be capable of being copied. Therefore, call center agents often resort to manually typing in the data they would prefer to simply copy and past from one application to another. However, due to time pressures, the repeatability of the action, the quality of the extraction, etc., the data entry accuracy of manual entries may be below a desired level.

SUMMARY

Methods herein provide, on a graphic user interface of a remote computerized device, a selection or "cutting" pointer movement operation. The cutting pointer movement operation selects a portion (e.g., zone or cut portion) of an image containing characters. Therefore, such methods receive, from the remote computerized device from time to time, the cut portion of an image containing characters into a network-based server. The remote computerized device is in communication with the network-based server through a computerized network, for example.

These methods then execute different optical character recognition processes on the image to automatically recognize the characters in the image (as controlled by the network-based server). For example, the methods herein can utilize multiple different character recognition processes that produce different results from one another. Also, these methods aggregate the recognition results from the different optical character recognition processes, to produce a final character recognition result (using the network-based server). The aggregation process includes relatively higher confidence recognized characters and relatively lower confidence recognized characters in the final character recognition result. More specifically, the aggregating process can rank the results from the different optical character recognition processes to rank the relatively higher confidence recognized characters and the relatively lower confidence recognized characters, so that only the highest few possible recognized character results are selected for inclusion in the final character recognition result.

These methods then output the final character recognition result from the network-based server to the remote computerized device over the computerized network. More specifically, the output provides the relatively higher confidence recognized characters as default characters for pasting, and also provides the relatively lower confidence recognized characters as alternate characters for pasting. Additionally, these methods provide (on the graphic user interface of the remote computerized device, for example) a default pointer movement operation (which can be no action) that automatically pastes the default characters for pasting into another input field on the graphic user interface of the remote computerized device. A secondary pointer movement operation, that automatically pastes one or more of the alternate characters for pasting into the input field, is also provided on the graphic user interface by the output. Also, these methods can provide, on the graphic user interface of the remote computerized device, a manual override for supplementing and correcting the final character recognition result.

Exemplary systems herein include, among other components, a network-based server in communication with a remote computerized device through a computerized network, and a remote program running on the remote computerized device. The remote program runs on the remote computerized device and provides (e.g., on the graphic user interface of the remote computerized device) and a selection or "cutting" pointer movement operation. The cutting pointer movement operation selects a portion of an image containing characters. The network-based server therefore receives (from the remote computerized device) from time to time the selected or "cut" portion of an image containing characters.

The network-based server then executes different optical character recognition processes on the image to automatically recognize the characters in the image. For example, the network-based server executes different optical character recognition processes by utilizing multiple different character recognition processes that produce different results from one another.

The network-based server also aggregates the recognition results from the different optical character recognition processes to produce a final character recognition result. The aggregating process includes relatively higher confidence recognized characters and relatively lower confidence recognized characters in the final character recognition result. Therefore, the network-based server can ranking results from the different optical character recognition processes to rank the relatively higher confidence recognized characters and the relatively lower confidence recognized characters in the final character recognition result.

Also, the network-based server outputs the final character recognition result to the remote computerized device over the computerized network. The output provides (to the remote program running on the remote computerized device) the relatively higher confidence recognized characters as default characters for pasting, and provides the relatively lower confidence recognized characters as alternate characters for pasting.

The remote program running on the remote computerized device in turn provides (on the graphic user interface of the remote computerized device) a default pointer movement operation (which can simply be the user taking no action) that automatically pastes the default characters for pasting into an input field on the graphic user interface of the remote computerized device, and a secondary pointer movement operation that automatically pastes one or more of the alternate characters for pasting into the input field. The remote program running on the remote computerized device can also provide (on the graphic user interface of the remote computerized device) a manual override for supplementing and correcting the final character recognition result.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, call center agents often resort to manually typing in the data they would prefer to simply copy and past from one application to another. However, due to time pressures, the repeatability of the action, the quality of the extraction, etc., the data entry accuracy of manual entries may be below a desired level.

In view of the foregoing, the systems and methods herein execute different optical character recognition processes on an image and aggregate the recognition results. The systems and methods herein provide relatively higher confidence recognized characters as default characters for pasting and provide alternate, lower confidence characters for user selection.

Figure 1:
FIG. 1 is a schematic diagram illustrating an input document.
Figure 2:
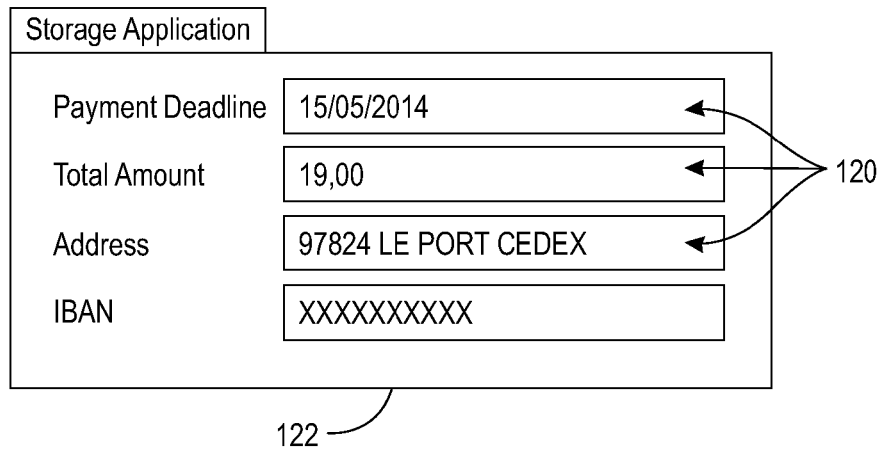
FIG. 2 is a schematic diagram illustrating a screenshot of input fields.

As shown in FIG. 1, a sample document 110 with data fields 112 that are to be transferred may be presented to call center agent. FIG. 2 illustrates a sample screenshot 124 of an application having destination entry fields 122 where the data from data fields 112 in FIG. 1 may be entered. As noted above, the data from data fields 112 can be manually entered into destination entry fields 120 of a data entry input display 122 by a call center agent. However, the systems and methods herein automate such data entry (through an automated copy-paste OCR operation) to improve accuracy and reduce the workload on the call center agent.

More specifically, the systems and methods herein use OCR and to provide a viable solution for service centers. For example, the systems and methods herein provide an OCR copy/paste system with integrated snipped correction. The systems and methods herein can reduce the size of images sent to multiple OCR engines to receive immediate answers from the OCR engines, aggregate the results from the different OCR engines (e.g., voting OCR), optionally with patterns constrained for high quality OCR results, and provide a manual correction system by dragging on the mouse or the finger, to avoid losing time during correction.

Figure 3:
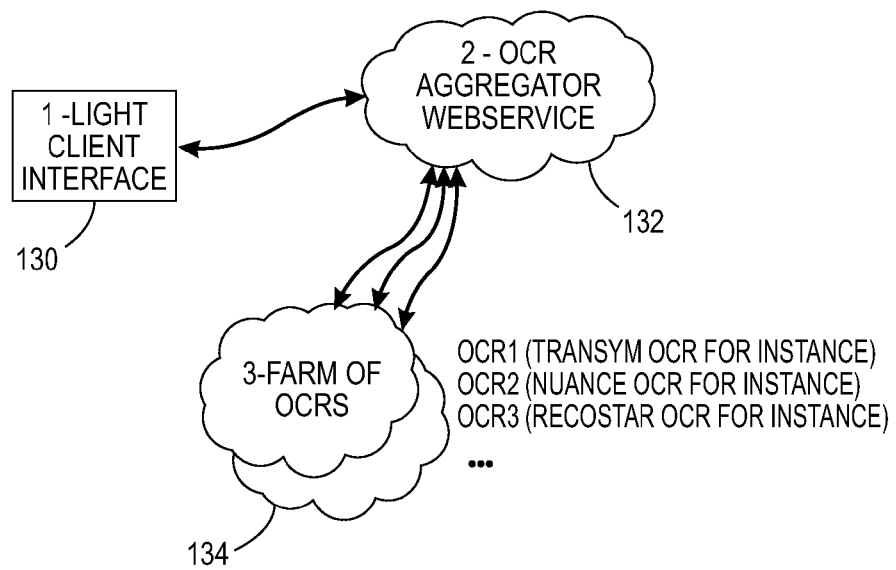
FIG. 3 is a schematic diagram illustrating systems herein.

As shown in FIG. 3, the systems and methods herein can include (in one example) a light application installed on an agent desktop that includes a quick and ergonomic action for copying data and correcting the selected data. As shown in FIG. 3, the systems and methods herein include, a web service 132 that calls different OCR engines, and aggregates and computes a common result with confidence values for each character recognized. The client application 130 starts, for example, by default on the call center agent's computer. The application 130 can be triggered in many different ways, for example by a keyboard shortcut, or a click on the system tray icon of the application 130, etc.

Figure 4:
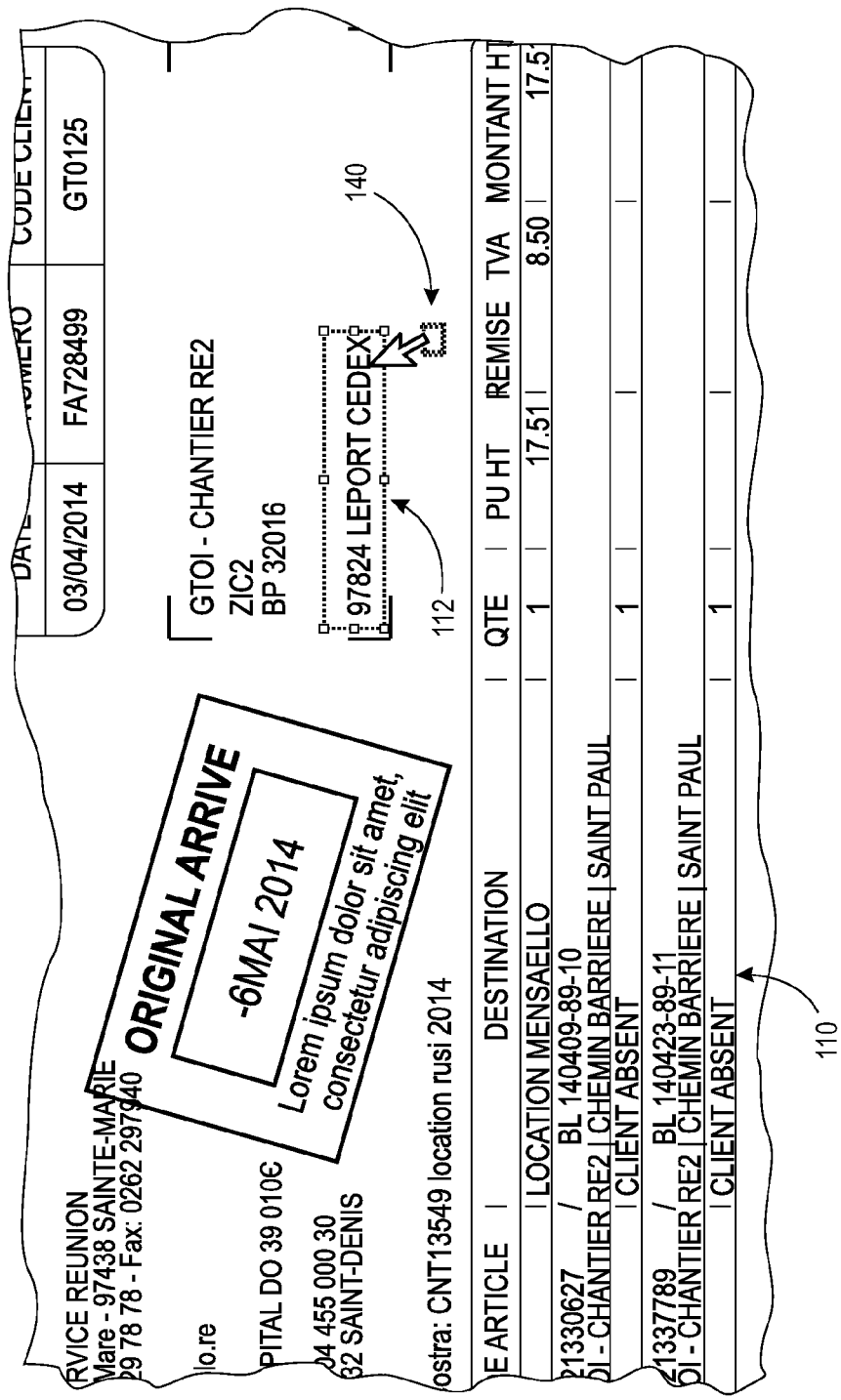
FIG. 4 is a schematic diagram illustrating an input document.

FIG. 4 illustrates a portion of the document 110 shown in FIG. 1 from which data will be copied (copy zones 112). In addition, FIG. 4 illustrates the graphic appearance of a pointer 140 that can correspond to any form user interface (e.g., touch screen, mouse, trackpad, arrows, keyboard input, etc.). Once the application 130 has started, the call center agent moves and presses on the mouse pointer 140 around the various zones 112 that contain data that the call center agent desires to use, and this pointer movement (dragging the mouse) selects the data 112 from the input document 110 that is to be processed through optical character recognition processes.

Figure 5:
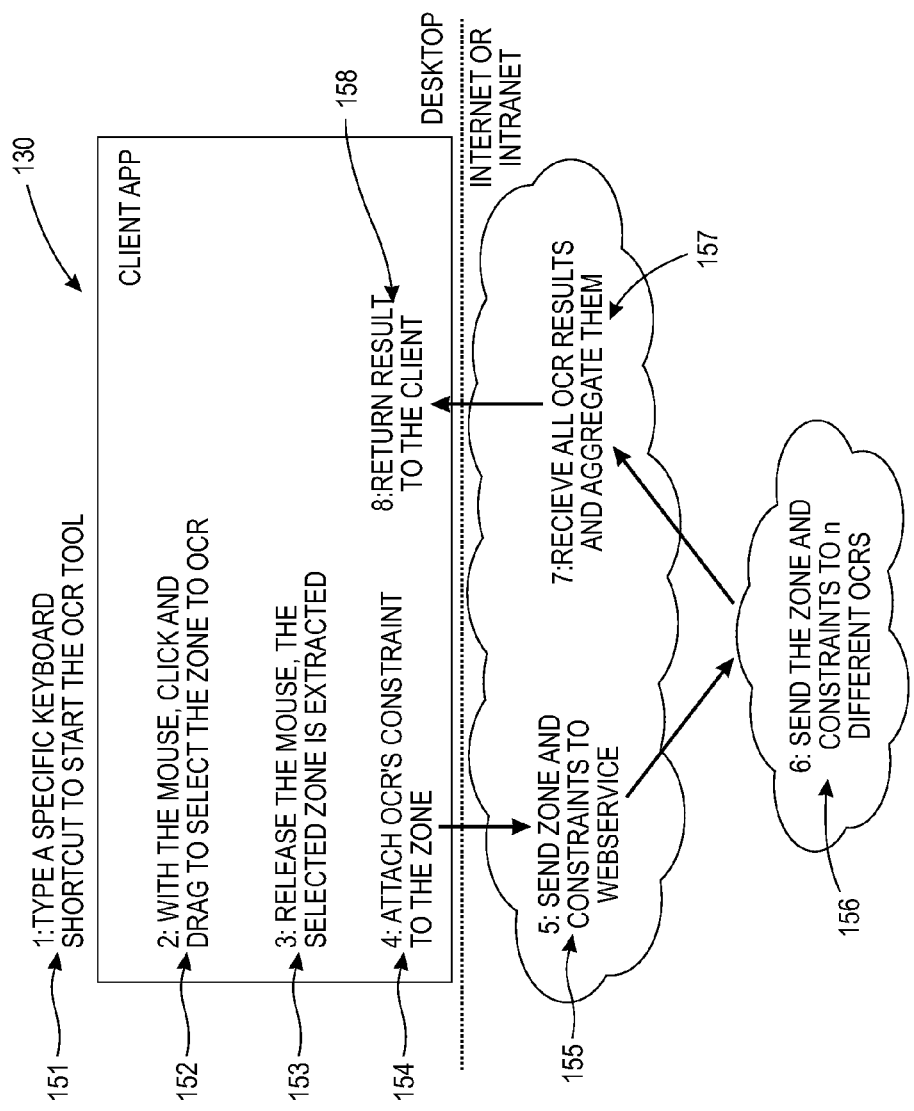
FIG. 5 is a flow diagram of various methods herein.

FIG. 5 illustrates some of the various steps and methods from the selection of the input until the return of the OCR system herein perform. Specifically, item 151 illustrates the action of the user typing a specific keyboard shortcut to start the OCR tool. Item 152 illustrates the user operating the mouse to click and drag, and thereby select the copy zone 112 from the input document 110 to identify the data that will be subjected to the optical character recognition process. Item 153 illustrates the action of the user releasing of the mouse so that the selected zone 112 is extracted from the input document 110. At the end of this copy step 153 shown in FIG. 5, the selected zone 112 is stored in a clipboard if the zone 112 is already a copy/pastable field or stored as an image by the application for OCR processing.

The accuracy of the application 130 can be improved for the results by adding OCR constraints (as illustrated in item 154) that could be shown for selection or directly called by other shortcuts or contextual menus. For example, some OCR constraints in item 154 can specify: that the text of the zone 112 is composed of only digits as a phone number; alphabets (letters) as a last name; that the selected zone 112 is handwritten; that text of the zone follows a specific pattern (like a mail pattern for instance); the language of the text (English/French/ . . . etc.) and/or the alphabet (Latin, Arabic, Cyrillic, . . . etc.) of the zone selected.

Next, as also shown in item 155 in FIG. 5, the application 130 sends the selected zone of data 112 and any constraints to the web service that will be controlling the various optical character recognition processes. Item 156 illustrates that the data within the selected zone 112 is sent to many different optical character recognition engines, each of which may process of the data differently (and thereby generate potentially different recognition results and/or recognition accuracy and confidence values). Following this, in item 157, the web service receives back the OCR results from the various OCR engines, and the web service aggregates such results. The aggregation system take part of the number of same result for each character of the zone 112 and the confidence score for each character and alternative characters. This can be seen as a OCR voting system. Next, in item 158, the aggregated results are returned to the client app 130. At this step the higher aggregated score from the voting system is store as default result in the clipboard aggregated.

The results output by the web service in item 158 can be more than a simple text, and can include for example, a list of candidate characters with confidence scores. Providing candidate characters with confidence scores provides the user with alternatives to the initial default paste option (the highest ranking or highest confidence characters can be provided as the initial default paste option) and thereby provides the user with easy and quick correction possibilities.

Figure 6:
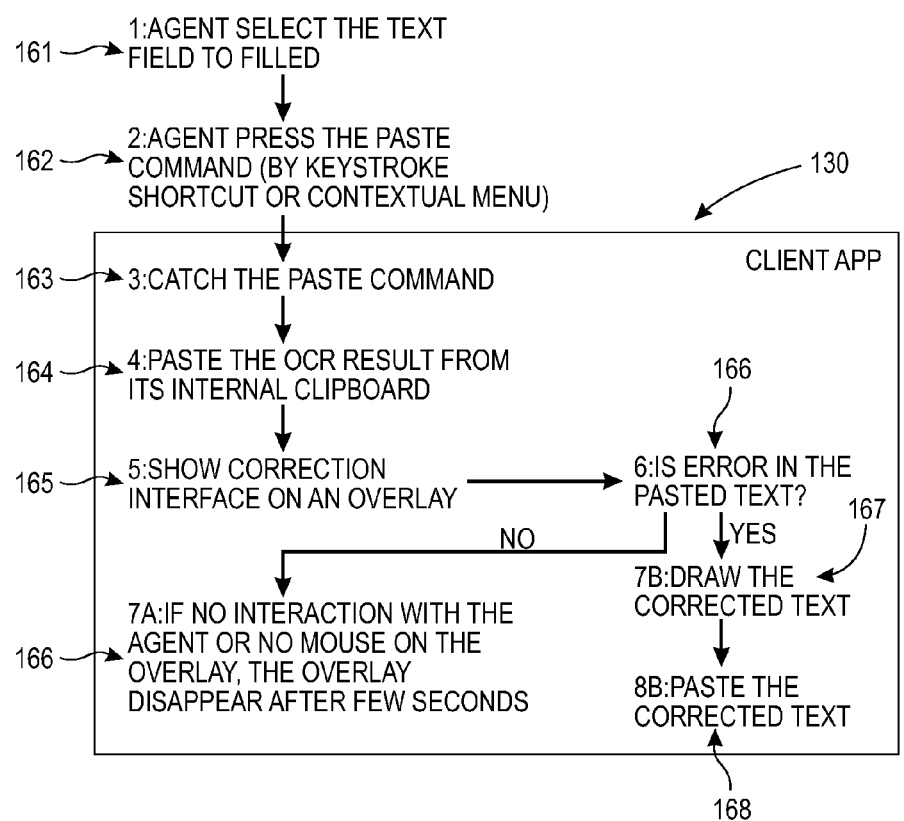
FIG. 6 is a flow diagram of various methods herein.

As shown in FIG. 6, after copying the field to extract (item 153 in FIG. 5) the agent simply places to pointer in the destination application and the destination field 161 to select the text field to be filled where the agent executes the paste command 162. Thus, in item 162, the agent presses the paste command, by shortcut or contextual menu. At this moment the client tool 130 catches the paste command in item 163, checks if there is a paste result from the OCR to paste, and pastes the result into the field in item 164. At the same time the client app 130 shows a correction interface on an overlay (item 165) to quickly correct the result if there are any errors 166. Specifically, as shown in FIG. 6, if there is an error in the pasted text, in item 167, the user can provide (draw) the corrected text and then paste the corrected text into the text field to be filled in item 168. As shown in item 166, if no error is present, the correction user interface 168 will automatically disappear after few seconds.

Figure 7:
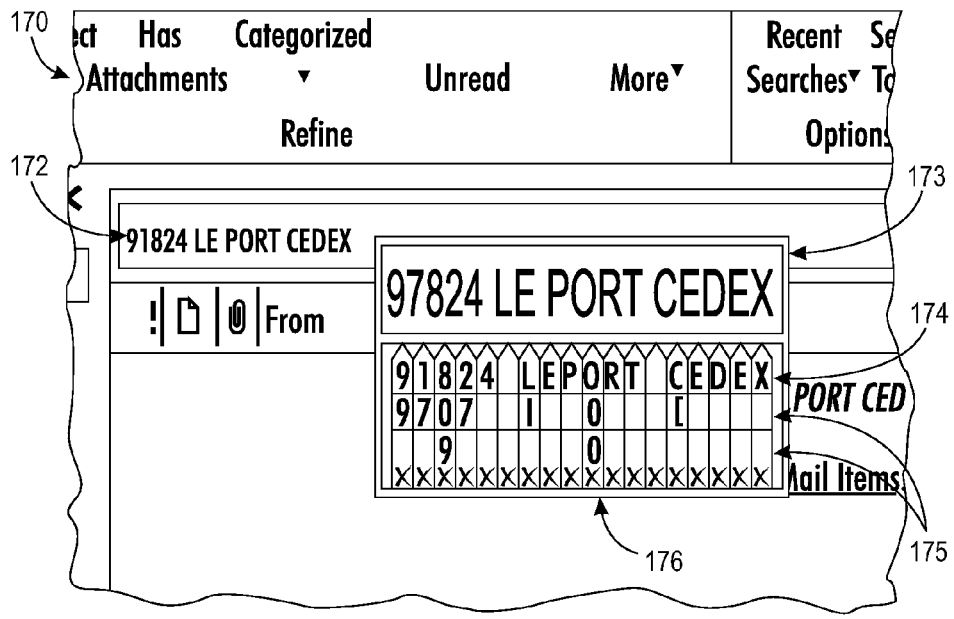
FIG. 7 is a schematic diagram illustrating a screenshot provided herein.

One exemplary screenshot 170 provided by the application 130 is shown in FIG. 7, where the correction interface 176 is shown underneath the paste field 172. As shown in FIG. 7, the correction interface 176 presents various information to help the user correctly paste the data that was optically character recognized to makes it easier to be able to check the data in one look, and correct the data in one movement. More specifically, item 173 illustrates the image obtained from the copy zone 112 (FIG. 1). The top line within the correction interface 176 (identified by reference numeral 174) presents the user with the default initial text for pasting (that ranks the highest when the different optical character recognition processes were aggregated in item 157 in FIG. 5). By default, assuming no OCR error is present and that the user takes no action with the pointer 140, the default initial text for pasting 174 will be automatically pasted into the paste field 172, and the correction interface 176 well automatically be hidden after few seconds.

However, in order to assist the user in the event that some correction is needed to the default initial text for pasting 174, the application 130 also presents alternate (lower confidence) optical character recognition solutions, ordered by confidence order in subsequent lines 175. Therefore, rather than simply allowing the default initial text for pasting 174 to be automatically pasted into the paste field 172, the user can move the pointing device 140 to select one or more of the alternate, lower confidence optical characters 175, which the application 130 will then cause to be pasted into the paste field 172.

Figure 8:
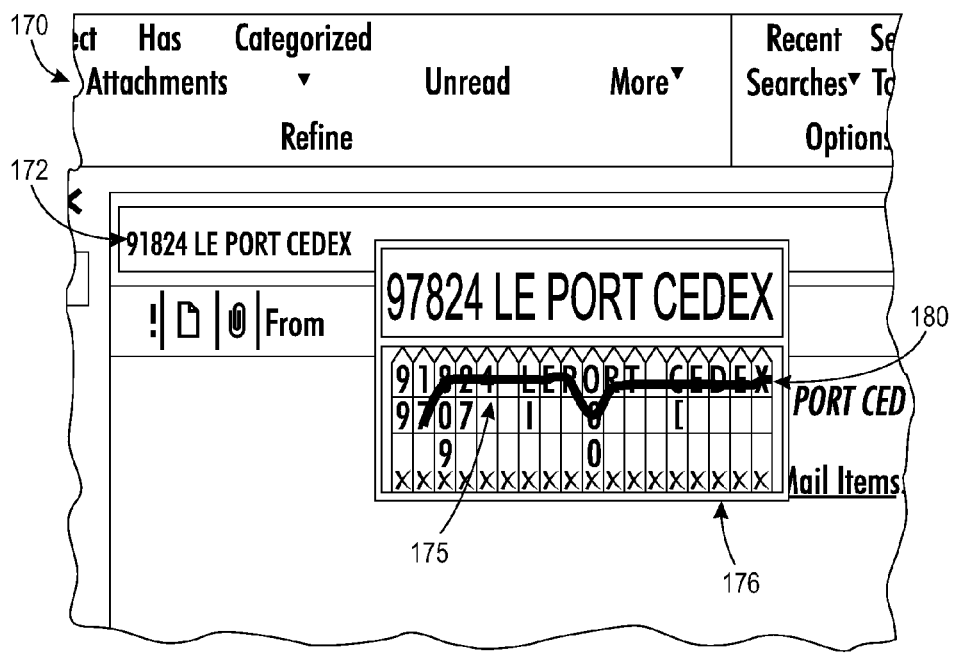
FIG. 8 is a schematic diagram illustrating a screenshot provided herein.

As shown in FIG. 8, if some errors are present in the default and initial text for pasting 174 and the user desires to select one or more of the alternate, lower confidence optical characters 175, the user has some options on how the alternate, lower confidence optical character recognition solutions 175 can be selected. In one option, the agent can use the pointing device to click on each individual correct character the agent encounters in the alternate solutions 175. In another option, the user can use the pointing device of the graphic user interface to click and drag a line through some of the alternate solutions 175 and some of the characters in the default initial text for pasting 174, and this is shown by the weaving selection action line 180 in FIG. 8. In other words, the user can use the pointing device of the graphic user interface to weave among the correct characters in a single motion moving across (e.g., from left to right, etc.) the various default and alternative suggestion recognition results 174, 175 to easily select the correct optical character recognition results in one movement very quickly. In addition, the user can directly type the correction character in the paste field 172 using the keyboard for complex corrections like insertion of missing characters.

Figure 9:
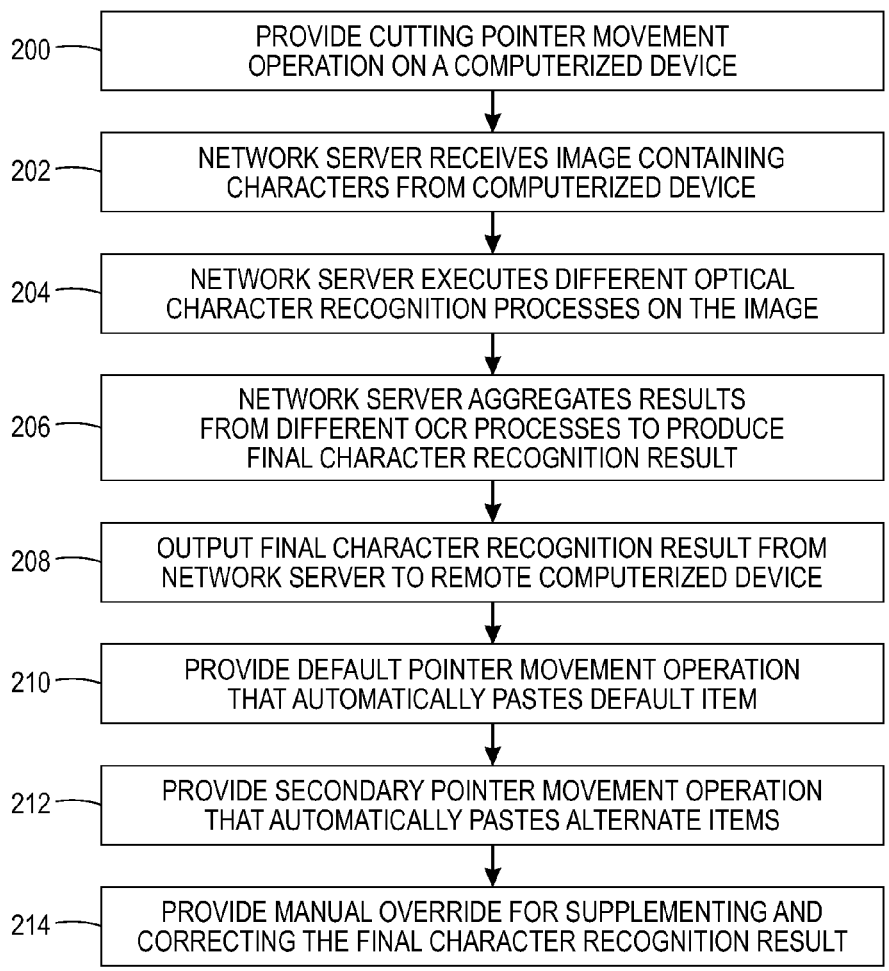
FIG. 9 is a flow diagram of various methods herein.

FIG. 9 is flowchart illustrating exemplary methods herein. In item 200, these methods provide, on a graphic user interface of a remote computerized device, a selection or "cutting" pointer movement operation. The cutting pointer movement operation in item 200 selects a portion of an image containing characters. Therefore, in item 202 such methods receive, from the remote computerized device from time to time, the portion of the image containing characters (that has been selected or "cut" in item 200) into a network-based server. The remote computerized device is in communication with the network-based server through a computerized network, for example.

In item 204, these methods then execute different optical character recognition processes on the image to automatically recognize the characters in the image (as controlled by the network-based server). For example in item 204, the methods herein can utilize multiple different character recognition processes that produce different results from one another. Thus, in item 204, the network-based server can perform some or all of the different OCR processes (using different OCR programs maintained by the network-based server) or the network-based server can request that different OCR engines operating on different computerized devices perform some or all of the different OCR processes. In any case, the different OCR programs will return different character recognition results when analyzing the same image portion that is cut from the full image in item 200.

Also, in item 206, these methods, aggregate the recognition results from the different optical character recognition processes, to produce a final character recognition result (using the network-based server). More specifically, in item 206, these methods compare the different recognition results output by the different OCR engines in item 204 to rank such recognition results, and then choose the highest ranking result that is to be presented in default paste field 174. Further, the ranking of the recognition results from the different OCR engines can be based on individual characters, words, phrases, sentences, etc.

For example, if the majority of the OCR engines recognized the same character, word, phrase, etc. (e.g., the most popular recognition result); that most popular character, word, phrase, etc., from the different OCR engines would be presented in the default paste field 174 (FIG. 7). The second most popularly recognized character, word, phrase, etc., for the same image portion subjected to OCR would be presented as the next alternative recognition result in item 175. Following that, in the second line in item 175 in FIG. 7, the third most popular recognized character, word, phrase, etc., for the same image portion subjected to OCR would be presented as the next alternative recognition result in item 175. While popularity of recognition is discussed in this example, those skilled in the art would understand that other ranking methods could be used to rank the different results from the different OCR engines analyzing the same image portion.

Thus, the aggregating process in item 206 includes relatively higher confidence recognized characters and relatively lower confidence recognized characters in the final character recognition result. More specifically, the aggregating process in item 206 can rank the results from the different optical character recognition processes to rank the relatively higher confidence recognized characters and the relatively lower confidence recognized characters, so that only the highest few possible recognized character results are selected for inclusion in the final character recognition result.

These methods then output the final character recognition result from the network-based server to the remote computerized device over the computerized network in item 208 (as shown in FIG. 7, discussed above). More specifically, the output in item 208 provides the relatively higher confidence recognized characters as default characters for pasting, and also provides the relatively lower confidence recognized characters as alternate characters for pasting.

Additionally, this method provides (on the graphic user interface of the remote computerized device, for example) a default pointer movement operation that automatically pastes the default characters for pasting into another input field on the graphic user interface of the remote computerized device (e.g. pasted into the destination entry fields 120 shown in FIG. 2) as shown in item 210 (and as shown in FIG. 8, discussed above). In one example, the default pointer movement operation in item 210 can be for the user to take no action except placing the cursor in the destination entry fields 120 to be pasted and clicking on the pointer button. After a set time (e.g., a few seconds) the correction interface 176 will simply stop appearing on the graphic user interface if no action is taken. Also, the user can select a "paste default result" from a menu of choices, or the user can take other action to cause the default recognition result to be pasted into the destination entry fields 120 shown in FIG. 2.

A secondary pointer movement operation, that automatically pastes one or more of the alternate characters for pasting into the destination entry fields 120, is also provided on the graphic user interface by the output (in item 212). For example, as discussed above and as shown in FIG. 8, a user can select individual characters, words, phrases, etc., (some from the default characters 174, some from the alternative characters 175) by various pointer movements, pointer clicks, pointer drags, etc., so as to select the appropriate characters, words, phrases, etc., to be pasted into the destination entry fields 120 from lines 174 and 175. Once selected, such characters, words, phrases, etc., are automatically pasted into the destination entry fields 120 when the user clicks on one of the destination entry fields 120 and selects a paste menu option (or the takes no further action, and simply allows the correction interface 175 to disappear from the graphic user interface).

Also, these methods can provide, on the graphic user interface of the remote computerized device, a manual override for supplementing and correcting the final character recognition result, as shown in item 214. Thus, the user can type all the characters into the destination entry fields 120 shown in FIG. 2, the user can allow items 210 or 212 to automatically paste some of the recognized characters into the destination entry fields 120, the user can edit characters in the destination entry fields 120 after item 210 or 212 automatically paste recognized characters into the destination entry fields 120, etc. Therefore, the user always has the option to manually edit or change the recognized characters after such characters are automatically pasted into the destination entry fields 120 by the systems and methods herein.

The hardware described herein plays a significant part in permitting the foregoing method to be performed, rather than function solely as a mechanism for permitting a solution to be achieved more quickly, (i.e., through the utilization of a computer for performing calculations). More specifically, as would be understood by one ordinarily skilled in the art, the processes described herein (e.g., pointer cutting, pointer pasting, OCR processing, pointer movement and selection, pointer dragging, pointer menu selection, etc.) cannot be performed by human alone (or one operating with a pen and a pad of paper) and instead such processes can only be performed by a machine capable of automatic character recognition, capable of allowing a user to interact with the graphic user interface through a pointing device, etc. Also, processes such as electronic transmission of data over networks, etc., requires the utilization of different specialized machines.

Further, such machine-only processes are not mere "post-solution activity" because the cutting, OCR processing, pointer movement selection, etc., are all fundamental processing steps and are not post-solution activities. Similarly, the electronic transmissions among the different computerized devices utilize special-purpose equipment (telecommunications equipment, routers, switches, etc.) that are distinct from a general-purpose processor. Also, the data transmission is integral with the process performed by the methods herein, and is not mere post-solution activity, because the server directs the different OCR engines to operate and performs the aggregation and is separate from the user's computer (and such communications are preformed over the computerized network). In other words, these various machines are integral with the methods herein because the methods cannot be performed without the machines (and cannot be performed by humans alone).

Additionally, the methods herein solve many highly complex technological problems. For example, as mentioned above, call center agents often resort to manually typing in the data they would prefer to simply copy and past from one application to another. However, due to time pressures, the repeatability of the action, the quality of the extraction, etc., the data entry accuracy of manual entries may be below a desired level. Methods herein solve this technological problem by avoiding the need for center agents to manually type in the data. This reduces the amount of data entry accuracy problems associated with manual data entry. By increasing the accuracy of the data entry, less data entry machines are needed and less hardware needs to dedicate to systems that check the accuracy of the data maintained in the various databases. Thus, the methods herein reduce the amount and complexity of hardware and software needed to be purchased, installed, and maintained by providers, thereby solving a substantial technological problem that providers experience today.

Similarly, with respect to the users, the methods herein additionally solve many technological problems related to the security of user information. By automatically recognizing and pasting text from images, the user's interaction with the computer is simplified, and the time that the user must interact with the machine is reduced. In other words, because the user does not have to manually enter as much data or spend as much time entering data, the technology of the user device can be substantially simplified, thereby reducing cost, weight, size, etc., and providing many substantial technological benefits to the user.

Figure 10:
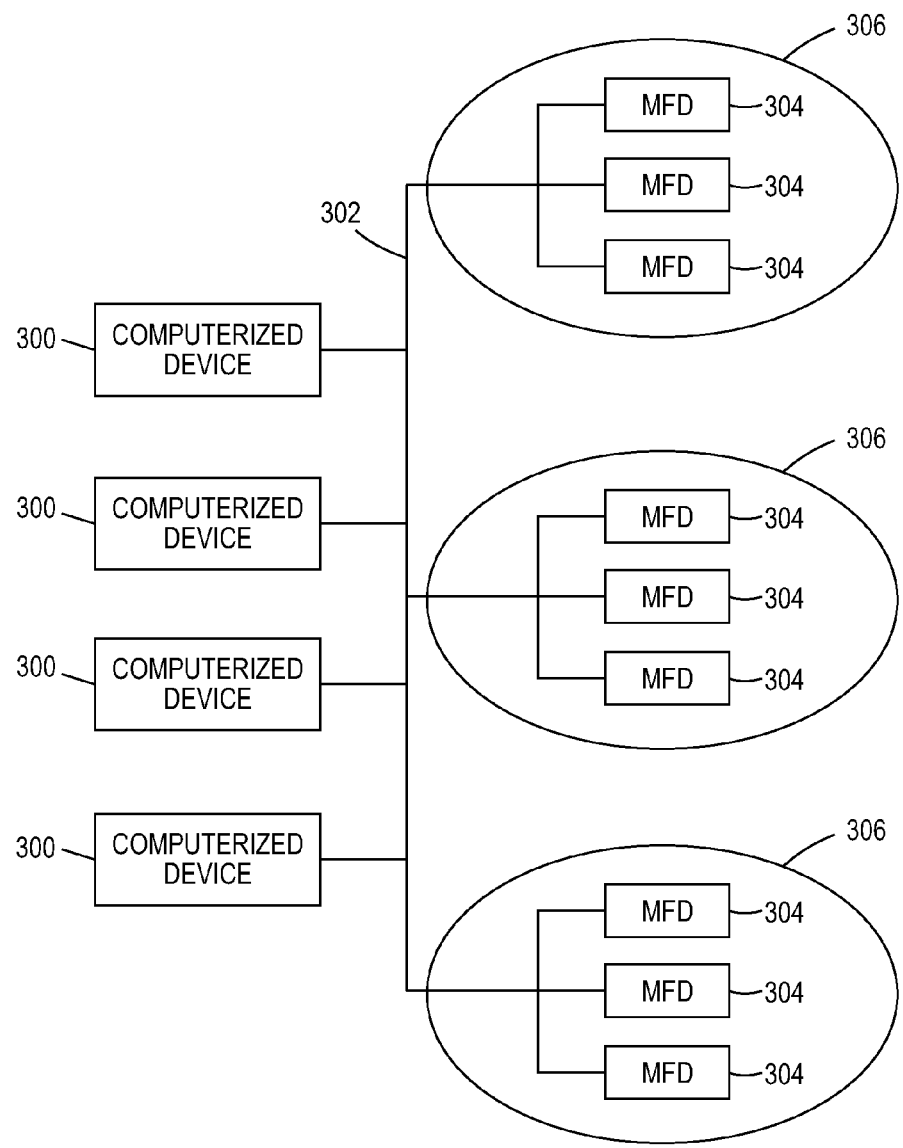
FIG. 10 is a schematic diagram illustrating systems herein.

As shown in FIG. 10, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 11:
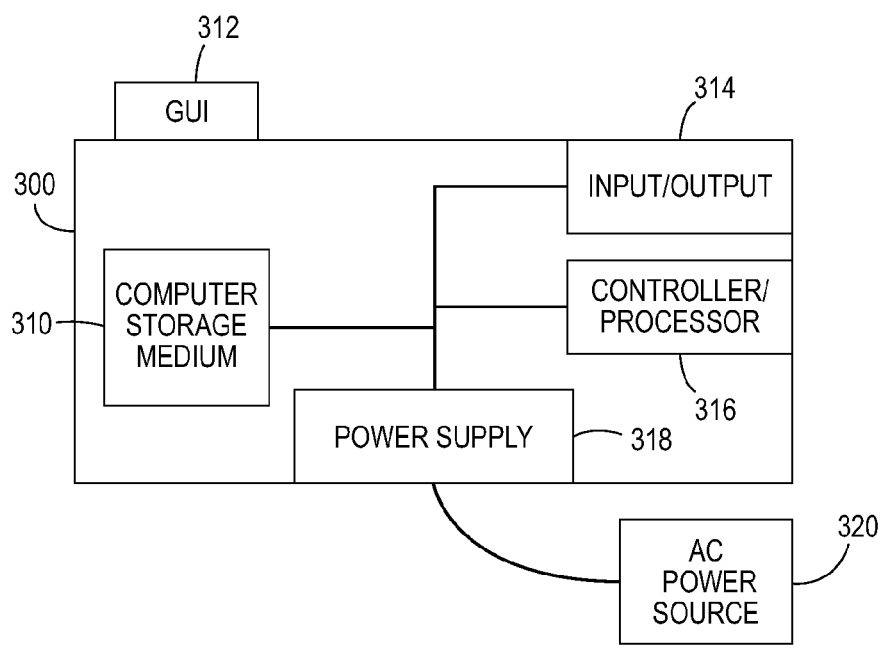
FIG. 11 is a schematic diagram illustrating devices herein.

FIG. 11 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a graphical user interface (GUI) assembly 312. The user may receive messages, instructions, and menu options from, and enter instructions through, the graphical user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 11, a body housing has one or more functional components that operate on power supplied from an alternating current (AC) source 320 by the power supply 318. The power supply 318 can comprise a common power conversion unit, power storage element (e.g., a battery), etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    receiving, from a remote computerized device, an image containing characters into a network-based server, said remote computerized device being in communication with said network-based server through a computerized network;
    executing different optical character recognition processes on said image to automatically recognize said characters in said image as controlled by said network-based server;
    aggregating recognition results from said different optical character recognition processes recognizing said characters in said image to produce a final character recognition result using said network-based server, said aggregating including relatively higher confidence recognized characters and relatively lower confidence recognized characters in said final character recognition result;
    outputting said final character recognition result from said network-based server to said remote computerized device over said computerized network;
    automatically pasting said relatively higher confidence recognized characters as default characters into an input field shown on a user interface of said remote computerized device;
    automatically providing a correction interface on said user interface adjacent said input field that displays said relatively lower confidence recognized characters as alternate characters; and
    automatically changing said default characters in said input field to ones of said alternate characters in response to cursor movement within said correction interface,
    said correction interface includes an option to have said cursor movement be one cursor movement that draws a line through a correct pattern of said default characters and said alternate characters.

2. The method according to claim 1, further comprising providing, on said user interface of said remote computerized device, a cutting pointer movement operation, said cutting pointer movement operation selecting a portion of an image as said image containing characters.

3. The method according to claim 1, said executing different optical character recognition processes comprising utilizing multiple different character recognition processes, said multiple different character recognition processes producing different results from one another.

4. The method according to claim 1, said aggregating ranking results from said different optical character recognition processes to rank said relatively higher confidence recognized characters and said relatively lower confidence recognized characters.

5. The method according to claim 1, further comprising providing, on said user interface of said remote computerized device, a manual override for supplementing and correcting said final character recognition result.

6. A method comprising:
    receiving, from a remote computerized device, an image containing characters into a network-based server, said remote computerized device being in communication with said network-based server through a computerized network;

executing different optical character recognition processes on said image to automatically recognize said characters in said image as controlled by said network-based server;

aggregating recognition results from said different optical character recognition processes recognizing said characters in said image to produce a final character recognition result using said network-based server, said aggregating including relatively higher confidence recognized characters and relatively lower confidence recognized characters in said final character recognition result;

outputting said final character recognition result from said network-based server to said remote computerized device over said computerized network;

automatically pasting said relatively higher confidence recognized characters as default characters into an input field shown on a user interface of said remote computerized device;

automatically providing a correction interface on said user interface adjacent said input field that displays said relatively lower confidence recognized characters as alternate characters;

automatically changing said default characters in said input field to ones of said alternate characters in response to cursor movement within said correction interface, said correction interface includes an option to have said cursor movement be one cursor movement that draws a line through a correct pattern of said default characters and said alternate characters; and providing, on said correction interface:
a default pointer movement operation automatically pasting said default characters for pasting into an input field on said user interface of said remote computerized device; and
a secondary pointer movement operation automatically pasting one or more of said alternate characters for pasting into said input field.

7. The method according to claim 6, further comprising providing, on said user interface of said remote computerized device, a cutting pointer movement operation, said cutting pointer movement operation selecting a portion of an image as said image containing characters.

8. The method according to claim 6, said executing different optical character recognition processes comprising utilizing multiple different character recognition processes, said multiple different character recognition processes producing different results from one another.

9. The method according to claim 6, said aggregating ranking results from said different optical character recognition processes to rank said relatively higher confidence recognized characters and said relatively lower confidence recognized characters.

10. The method according to claim 6, further comprising providing, on said user interface of said remote computerized device, a manual override for supplementing and correcting said final character recognition result.

11. A system comprising:
a network-based server in communication with a remote computerized device through a computerized network; and
a remote program running on said remote computerized device,
said network-based server receiving, from said remote computerized device, an image containing characters,
said network-based server executing different optical character recognition processes on said image to automatically recognize said characters in said image,
said network-based server aggregating recognition results from said different optical character recognition processes recognizing said characters in said image to produce a final character recognition result,
said aggregating including relatively higher confidence recognized characters and relatively lower confidence recognized characters in said final character recognition result,
said network-based server outputting said final character recognition result to said remote computerized device over said computerized network,
said network-based server automatically pasting, to said remote program running on said remote computerized device, said relatively higher confidence recognized characters as default characters into an input field shown on a user interface of said remote computerized device,
said remote program running on said remote computerized device automatically providing a correction interface on said user interface adjacent said input field that displays said relatively lower confidence recognized characters as alternate characters,
said remote program running on said remote computerized device automatically changing said default characters in said input field to ones of said alternate characters in response to cursor movement within said correction interface, and
said correction interface includes an option to have said cursor movement be one cursor movement that draws a line through a correct pattern of said default characters and said alternate characters.

12. The system according to claim 11, said remote program running on said remote computerized device providing, on said user interface of said remote computerized device, a cutting pointer movement operation, said cutting pointer movement operation selecting a portion of an image as said image containing characters.

13. The system according to claim 11, said network-based server executing different optical character recognition processes by utilizing multiple different character recognition processes, said multiple different character recognition processes producing different results from one another.

14. The system according to claim 11, said network-based server aggregating ranking results from said different optical character recognition processes to rank said relatively higher confidence recognized characters and said relatively lower confidence recognized characters.

15. The system according to claim 11, said remote program running on said remote computerized device providing, on said user interface of said remote computerized device, a manual override for supplementing and correcting said final character recognition result.

16. A system comprising:
a network-based server in communication with a remote computerized device through a computerized network; and
a remote program running on said remote computerized device,
said network-based server receiving, from said remote computerized device, an image containing characters,
said network-based server executing different optical character recognition processes on said image to automatically recognize said characters in said image, said network-based server aggregating recognition results from said different optical character recognition processes recognizing said characters in said image to produce a final character recognition result, said aggregating including relatively higher confidence recognized characters and relatively lower confidence recognized characters in said final character recognition result, said network-based server outputting said final character recognition result to said remote computerized device over said computerized network, said network-based server automatically pasting, to said remote program running on said remote computerized device, said relatively higher confidence recognized characters as default characters into an input field shown on a user interface of said remote computerized device, said remote program running on said remote computerized device automatically providing a correction interface on said user interface adjacent said input field that displays said relatively lower confidence recognized characters as alternate characters, said remote program running on said remote computerized device automatically changing said default characters in said input field to ones of said alternate characters in response to cursor movement within said correction interface, said correction interface includes an option to have said cursor movement be one cursor movement that draws a line through a correct pattern of said default characters and said alternate characters, and said remote program running on said remote computerized device providing, on said correction interface:
- a default pointer movement operation automatically pasting said default characters for pasting into an input field on said user interface of said remote computerized device; and
- a secondary pointer movement operation automatically pasting one or more of said alternate characters for pasting into said input field.

17. The system according to claim 16, said remote program running on said remote computerized device providing, on said user interface of said remote computerized device, a cutting pointer movement operation, said cutting pointer movement operation selecting a portion of an image as said image containing characters.

18. The system according to claim 16, said network-based server executing different optical character recognition processes by utilizing multiple different character recognition processes, said multiple different character recognition processes producing different results from one another.

19. The system according to claim 16, said network-based server aggregating ranking results from said different optical character recognition processes to rank said relatively higher confidence recognized characters and said relatively lower confidence recognized characters.

20. The system according to claim 16, said remote program running on said remote computerized device providing, on said user interface of said remote computerized device, a manual override for supplementing and correcting said final character recognition result.

* * * * *